(12) United States Patent
Janarthanam et al.

(10) Patent No.: US 10,552,235 B2
(45) Date of Patent: Feb. 4, 2020

(54) UNIFORM EVENT FRAMEWORK

(71) Applicant: SuccessFactors, Inc., South San Francisco, CA (US)

(72) Inventors: Baskaran Janarthanam, Cupertino, CA (US); Dmitri Krakovsky, Hillsborough, CA (US); David Ragones, Piedmont, CA (US); Abhijit Salvi, Cupertino, CA (US); Abbas Raza, Dublin, CA (US); Murali Mazhavanchery, San Francisco, CA (US); Sirisha Ayyagari, Foster City, CA (US); Ankur Bhatt, San Francisco, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 17 days.

(21) Appl. No.: 14/984,113

(22) Filed: Dec. 30, 2015

(65) Prior Publication Data

US 2017/0068578 A1    Mar. 9, 2017

Related U.S. Application Data

(60) Provisional application No. 62/214,848, filed on Sep. 4, 2015.

(51) Int. Cl.
*G06F 9/54*    (2006.01)

(52) U.S. Cl.
CPC .................... *G06F 9/542* (2013.01)

(58) Field of Classification Search
None
See application file for complete search history.

(56) References Cited

U.S. PATENT DOCUMENTS

| | | | |
|---|---|---|---|
| 2002/0010804 A1* | 1/2002 | Sanghvi | G06F 9/542 719/318 |
| 2002/0016867 A1* | 2/2002 | Kampe | G06F 9/542 719/318 |

\* cited by examiner

*Primary Examiner* — Craig C Dorais
(74) *Attorney, Agent, or Firm* — Fountainhead Law Group P.C.

(57) ABSTRACT

Some embodiments provide a system that includes a set of event publishers configured to publish events occurring on the event publishers. The system also includes a uniform event framework configured to receive, from an event publisher in the set of event publishers, an event notification indicating an event occurred on the event publisher and generate an event structure based on the event notification. The system further includes an event bus configured to receive the event notification from the uniform event framework and send the event structure to a set of event subscribers for consumption of the event structure. Each event publisher in the set of event publishers is further configured to receive different callbacks from different event subscribers in the set of event subscribers for different sets of data associated with the event.

20 Claims, 5 Drawing Sheets

UNIFORM EVENT FRAMEWORK

CROSS-REFERENCE TO RELATED APPLICATION

The instant non-provisional patent application claims priority to U.S. Provisional Patent Application No. 62/214,848 filed Sep. 4, 2015 and incorporated by reference in its entirety herein for all purposes.

BACKGROUND

Software systems often have many applications and components running on the system. In some instances, the applications and components of the system may constantly generate events throughout the operation of the system. When an application or component generates an event, the application or component may send the event and data associated with the event to one or more interested applications and/or components. In some cases, the application or component sends different data associated with the event to different interested applications and/or components.

SUMMARY

In some embodiments, a system includes a set of event publishers configured to publish events occurring on the event publishers. The system also includes a uniform event framework configured to receive, from an event publisher in the set of event publishers, an event notification indicating an event occurred on the event publisher and generate an event structure based on the event notification. The system further includes an event bus configured to receive the event notification from the uniform event framework and send the event structure to a set of event subscribers for consumption of the event structure. Each event publisher in the set of event publishers is further configured to receive different callbacks from different event subscribers in the set of event subscribers for different sets of data associated with the event.

In some embodiments, at least one event subscriber in the set of event subscribers and the uniform event framework are developed on a same software framework. At least one event subscriber in the set of event subscribers and the uniform event framework may be developed on different software frameworks. The event publisher may provide a set of application programming interfaces to the set of event subscribers through which the set of event subscribers send the callbacks for data associated with the event.

In some embodiments, the set of event subscribers is a first set of event subscribers and an event subscriber in the set of event subscribers is configured to forward the event structure to a second set of event subscribers operating on a different system. An event publisher in the set of event publishers may be a rules engine configured to publish events based on rules for configuring defined events. An event publisher in the set of event publishers may be an application configured to publish events based on code included in the application.

In some embodiments, a non-transitory computer-readable medium stores a program executable by at least one processing unit. The program receives, from an event publisher in a set of event publishers, an event notification indicating an event occurred on the event publisher. The program also generates an event structure based on the event notification. The program sends the event structure to a set of event subscribers for consumption of the event structure. Each event publisher in the set of event publishers is configured to receive different callbacks from different event subscribers in the set of event subscribers for different sets of data associated with the event.

In some embodiments, at least one event subscriber in the set of event subscribers and the uniform event framework are developed on a same software framework. At least one event subscriber in the set of event subscribers and the uniform event framework may be developed on different software frameworks. The event publisher may provide a set of application programming interfaces to the set of event subscribers through which the set of event subscribers send the callbacks for data associated with the event.

In some embodiments, the set of event subscribers is a first set of event subscribers and an event subscriber in the set of event subscribers is configured to forward the event structure to a second set of event subscribers operating on a different system. An event publisher in the set of event publishers may be a rules engine configured to publish events based on rules for configuring defined events. An event publisher in the set of event publishers may be an application configured to publish events based on code included in the application.

In some embodiments, a method receives, from an event publisher in a set of event publishers, an event notification indicating an event occurred on the event publisher. The method also generates an event structure based on the event notification. The method further sends the event structure to a set of event subscribers for consumption of the event structure. Each event publisher in the set of event publishers is configured to receive different callbacks from different event subscribers in the set of event subscribers for different sets of data associated with the event.

In some embodiments, at least one event subscriber in the set of event subscribers and the uniform event framework are developed on a same software framework. At least one event subscriber in the set of event subscribers and the uniform event framework may be developed on different software frameworks. The event publisher may provide a set of application programming interfaces to the set of event subscribers through which the set of event subscribers send the callbacks for data associated with the event.

In some embodiments, the set of event subscribers is a first set of event subscribers, wherein an event subscriber in the set of event subscribers is configured to forward the event structure to a second set of event subscribers operating on a different system. An event publisher in the set of event publishers may be a rules engine configured to publish events based on rules for configuring defined events.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing a uniform event framework for creating and distributing events structured in a uniform manner. In some embodiments, the uniform event framework receives event notifications from event publishers. In response to an event notification, the uniform event framework generates an event structure that describes the event that has occurred and specifies a destination for the event. Based on the specified destination of an event, the uniform event framework distributes the event structure to one or more subscribers of the event. Each subscriber that receives the event structure may retrieve some or all data associated with the event from the event publisher. In this manner, different subscribers may retrieve different sets of data associated with the event.

Figure 1:
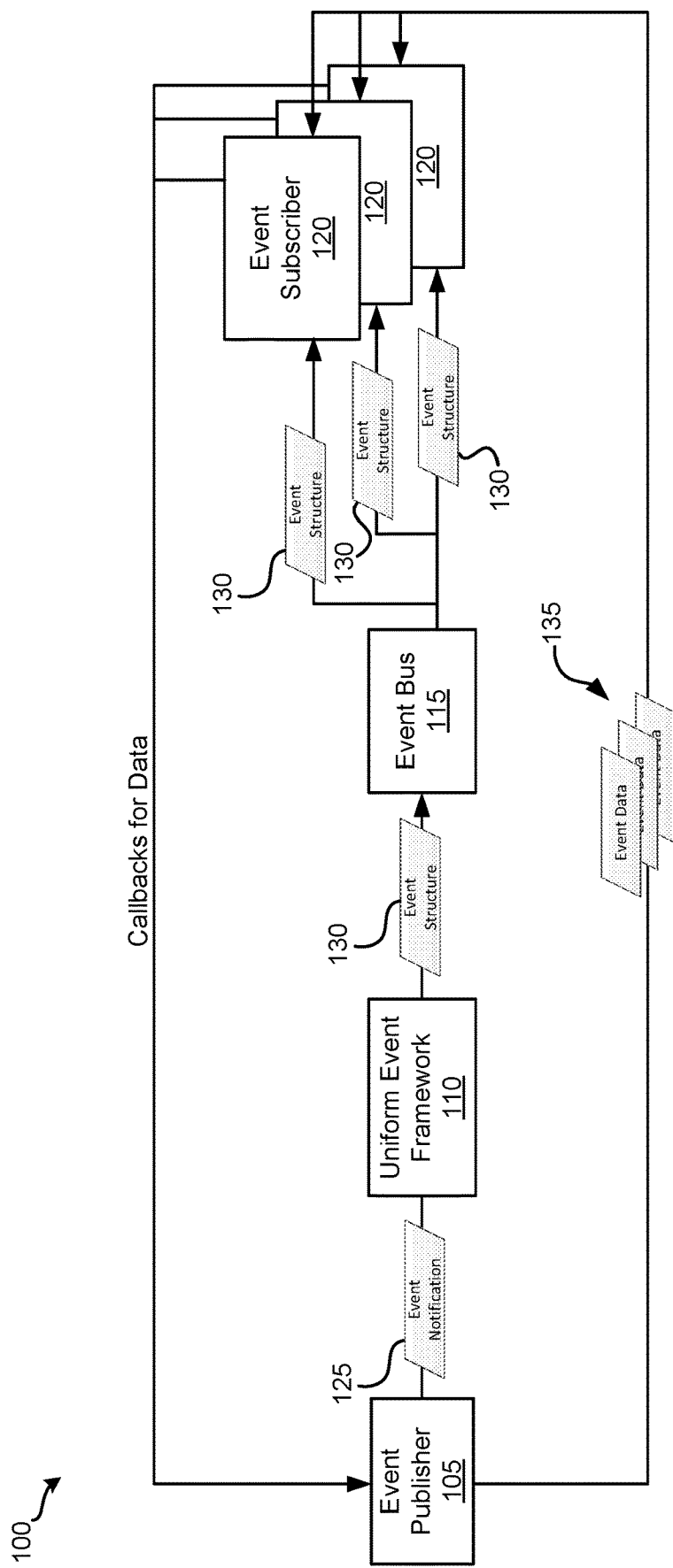
FIG. 1 illustrates a data flow of a system that includes a uniform event framework according to some embodiments.

FIG. 1 illustrates a data flow of a system 100 that includes a uniform event framework according to some embodiments. As shown, system 100 includes event publisher 105, uniform event framework 110, event bus 115, and event subscribers 120. In some embodiments, system 100 is a human capital management (HCM) system. In some embodiments, system 100 is a multi-tenant, cloud-based system implemented using a software as a service (SaaS) methodology. One of ordinary skill in the art will understand that system 100 may be one of any number of different systems (e.g., an enterprise resource planning (ERP) system, a customer relationship management (CRM) system, a supply chain management (SCM) system, a product lifecycle management (PLM) system, etc.).

Event publisher 105 handles publishing of events to uniform event framework 110. In some embodiments, event publisher 105 may be an application, application component, application module, rules engine, etc., operating on system 100. In some such embodiments, event publisher 105 publishes events occurring on event publisher 105. Event publisher 105 may publish events to uniform event framework 110 using any number of different methods. For instance, event publisher 105 may publish events based on rules (e.g., business rules) that define the events. In some embodiments, event publisher 105 may publish events based on event definitions hard-coded into event publisher 105.

In some embodiments, an event may be defined as a change in data associated with an application and/or application module. In some embodiments, an event may be defined as a change in the state of an object associated with an application and/or application module. In some embodiments, an event may be defined as a change in an HCM system. Example events in a HCM system may include candidate to onboardee events, onboardee to employee events, change in organization information, change in employee information (e.g., department, division, location, manager, etc.), change in job information (e.g., title, compensation grade, etc.), change in personal information (e.g., name, location, contact information, etc.), spot bonus events, creation of performance improvement plans, creation of global assignments, creation of concurrent jobs, update of public profiles, become manager events, becoming individual contributor events, becoming department head events, initial probation events, contingent to employee events, leave of absence events, suspension/furlough events, short-term disability events, long-term disability events, retirement events, termination events, vacation events, sick day events, performance rating events, potential rating events, nominated potential successor events, risk of loss events, training registration, training completion, creation of training classes, creation of goals, addition of competency, creation of career plans, creation of requisitions, closure of requisitions, submission of applications, assessment of applicants, checking of applicant backgrounds, hiring, creation of interview guides, setting up of interviewers, scheduling of interviews, confirming of interviews, assessment of complete interviews, creation of offers, acceptance of offers, referral of friends for jobs, creation of job alerts, expiration of job alerts, creation of performance management forms, training day events, promotion events, creation of paychecks, etc. In some embodiments, system 100 allows users to define any number of custom events (e.g., an employee moves to a different floor).

As illustrated in FIG. 1, when event publisher 105 publishes an event to uniform event framework 110, event publisher 105 sends event notification 125 to uniform event framework 110. In some embodiments, event notification 125 indicates that an event has occurred and does not contain data associated with the event.

Event publisher 105 may receive from event subscribers 120 callbacks for data associated with an event published by event publisher 105. In response to a particular callback from an event subscriber 120, the event publisher 105 provides event data 135 (e.g., data associated with the event) requested by the event subscriber 120. In some embodiments, the event publisher 105 provides services for event data 135 (e.g., creating data, updating data, reading data, deleting data, etc.) via a set of application programming interfaces (APIs). Examples of APIs include APIs are Open Data Protocol (OData) APIs, Representational State Transfer (REST)-based APIs, etc. One of ordinary skill in the art will appreciate that any number of additional and/or different types of APIs may be used in different embodiments.

Uniform event framework 110 handles providing uniform event structure 130 to event bus 115 in response to event notification 125. In response to receiving event notification 125 from event publisher 105, uniform event framework generates an event structure for the event that occurred on event publisher 105. In some embodiments, event structure 130 includes an event identifier for identifying an event, event publisher identifier for identifying event publisher 105, and pointers to data associated with the event (as opposed to the actual data associated with the event). Uniform event framework 110 performs callbacks to event publisher 105 for information associated with the event in some embodiments. Uniform event framework 110 may be implemented as a set of libraries in some embodiments.

Event bus 115 is responsible for distributing event structure 130 to event subscribers 120. In different embodiments, event bus 115 uses any number of different techniques to distribute event structure 130 to event subscribers 120. For example, event bus 115 may use a set of APIs (e.g., REST-based APIs) provided by a particular event subscriber 120 to send event structure 130 to the particular event subscriber 120. Event bus 115 may call a function implemented by a particular event subscriber 120 to send event structure 130 to the particular event subscriber 120. Event bus 115 may be implemented as a set of libraries in some embodiments.

Event subscribers 120 may receive event structures 130 from event bus 115. In some embodiments, event subscribers 120 may register to receive events published by event publisher 105. Each event subscriber 120 may be an application, application component, application module, rules engine, etc., operating on system 100 or on another system (not shown), in some embodiments. An event subscriber 120 may be event publisher 105.

When a particular event subscriber 120 receives event structure 130 from event bus 115, the particular event subscriber 120 may perform callbacks to event publisher 105 to access data associated with the event. As mentioned above, event publisher 105 may provide access to such data via a set of APIs.

In some embodiments, a topic hierarchy may be employed to organize events. As mentioned above, an event structure may specify a destination for the event. The destination for an event structure may specify a topic in the topic hierarchy. This way, a particular event subscriber 120 may subscribe to a particular topic in the topic hierarchy and receive all events associated with the particular topic as well as events associated with topics below the particular topic in the topic hierarchy. For example, a topic hierarchy may include an Employment topic, an Assignment topic that is below the Employment topic in the topic hierarchy, and a Termination topic that is below the Assignment topic in the topic hierarchy. In such an example, a particular event subscriber 120 may subscriber to the Employment topic. Accordingly, the particular event subscriber 120 will receive events associated with the Employment topic, the Assignment topic, and the Termination topic.

While FIG. 1 shows one event publisher, one of ordinary skill in the art will appreciate that the system 100 may include any number of event publishers that operate in the same or similar manner as event publisher 105. In addition, FIG. 1 illustrates several event subscribers 120. One of ordinary skill in the art will understand that the system 100 may include any number of event subscribers 120 that may subscribe to one or more events from one or more event publishers 105.

Figure 2:
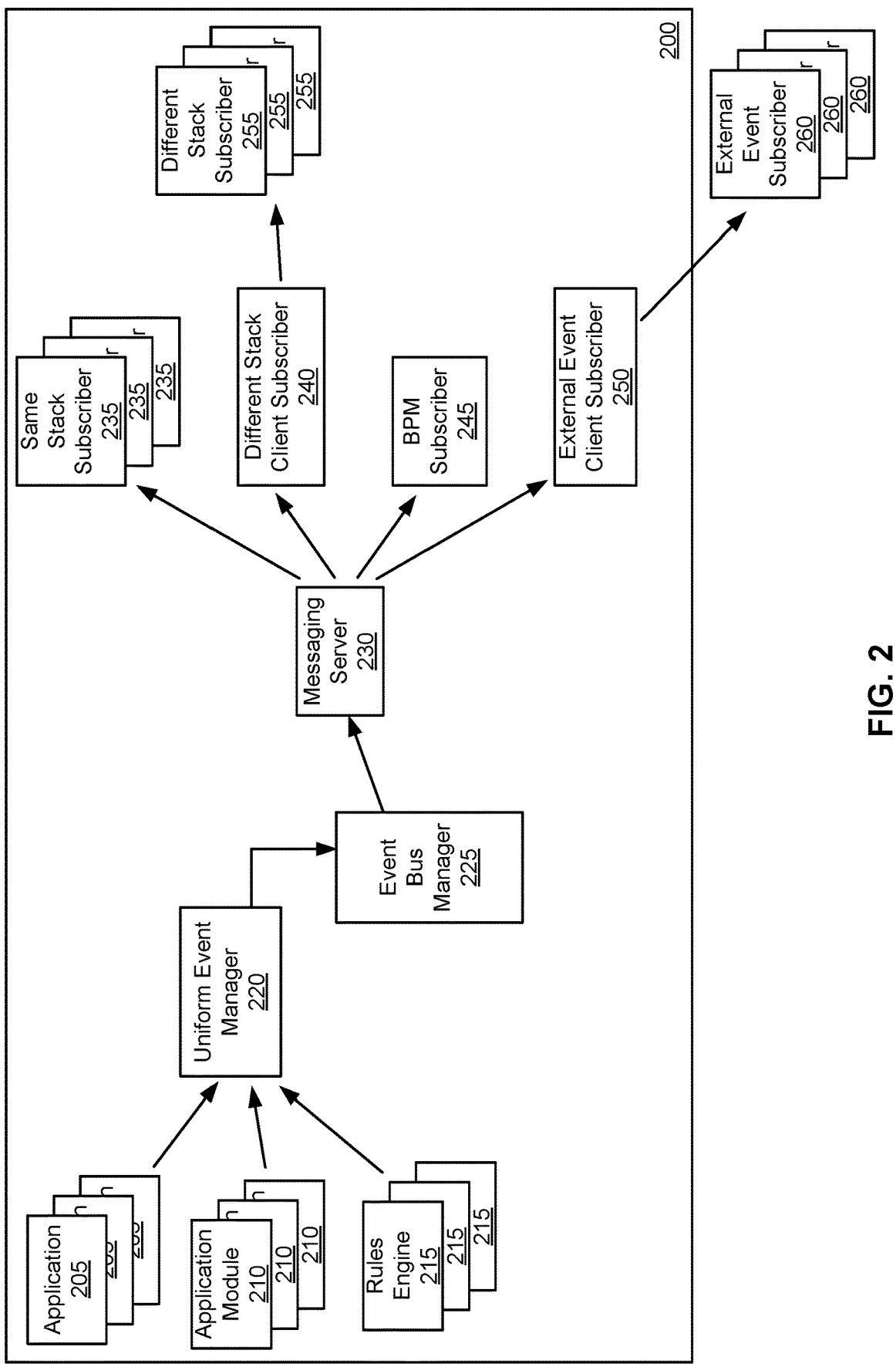
FIG. 2 illustrates an architecture of a system that implements a uniform event framework according to some embodiments.

FIG. 2 illustrates an architecture of a system 200 that implements a uniform event framework according to some embodiments. As shown, system 200 includes applications 205, application modules 210, rules engines 215, uniform event manager 220, event bus manager 225, messaging server 230, same stack subscribers 235, different stack client subscriber 240, different stack subscribers 255, business process management (BPM) subscriber 245, external event client subscriber 250, and external event subscribers 260. FIG. 2 also shows external event subscribers 260. In some embodiments, system 200 operates in the same or similar manner as system 100. For example, system 200 may be an HCM system in some embodiments. In some embodiments, system 200 may be a multi-tenant, cloud-based system implemented using a SaaS methodology. One of ordinary skill in the art will understand that system 200 may be one of any number of different systems (e.g., an ERP system, a CRM system, a SCM system, a PLM system, etc.).

In this example, each of applications 205, application modules 210, and rules engines 215 performs the same or similar operations as event publisher 105. For example, applications 205, application modules 210, and rules engines 215 send event notifications to uniform event manager 220. In some embodiments, applications 205 may be applications (e.g., HCM applications) that operate on system 200, application modules 210 are application modules and/or components (e.g., HCM modules) that operate on system 200, and rules engines 215 may be rules engines (e.g., HCM rules engines, business rules engines, etc.) that operate on system 200. Applications 205 and application modules 210 may publish events (also referred to as hard-coded events) based on code included in the applications 205 and application modules 210. Rules engine 215 may publish events (also referred to as configurable events) based on rules for configuring defined events. For example, a leave of absence event may be defined to occur when an employee is absent from work for a number of consecutive days. Different rules for different leave of absence events may be created that specify different numbers of consecutive days. This way, different leave of absence events may be configured. One of ordinary skill in the art will appreciate that additional and/or different types of event publishers that send event notifications to uniform event manager 220 are possible in different embodiments.

Uniform event manager 220 implements some of the operations of uniform event framework 110. For example, uniform event manager 220 generates event structures for events that occurred on applications 205, application modules 210, and rules engines 215 in response to receiving event notifications from applications 205, application modules 210, and rules engines 215. As mentioned above, in some embodiments, an event structure includes an event identifier for identifying an event, event publisher identifier for identifying the event publisher (e.g. application 205, application module 210, or rules engine 215), and pointers to data associated with the event (as opposed to the actual data associated with the event). In some embodiments, an event structure may also indicate that the event is allowed to be distributed externally to the system 200. Uniform event manager 220 may be implemented as a set of libraries in some embodiments.

Event bus manager 225 implements event bus operations of uniform event framework 110. For example, event bus manager 225 serves as a communication interface to messaging server 230 by receiving event structures from uniform event framework 110 and sending the event structures to messaging server 230. In some embodiments, event bus manager 225 may be implemented as a set of libraries. Event bus manager 225 uses, in some such embodiments, a messaging server client library to communicate with messaging server 230.

Messaging server 230 implements operations of event bus 115. In some embodiments, messaging server is responsible for receiving and sending messages between event bus manager 225 and same stack subscribers 235, event bus manager 225 and different stack client subscriber 240, event bus manager 225 and BPM subscriber 245, and event bus manager 225 and external event client subscriber 250. Messaging server 230 may be a message-oriented middleware (MOM) system (e.g., a HornetQ system, an ActiveMQ system, a RabbitMQ system, etc.) in some embodiments.

As mentioned above, a topic hierarchy may be utilized in some embodiments to organize events. In some such embodiments, messaging server 230 handles topic hierarchy processing of event structures to determine which subscribers (e.g., same stack subscribers 235, different stack client subscriber 240, BPM subscriber 245, and/or external event client subscriber 250) to send event structures of events.

Same stack subscribers 235 are subscribers that belong to the same stack as uniform event manager 220 and event bus manager 225. In some embodiments, a stack is a software development platform and/or framework (e.g., Ruby on Rails, Microsoft .NET, Java, etc.). As such, same stack subscribers 235, uniform event manager 220, and event bus manager 225 are all built on the same software development platform and/or framework in some such embodiments. In some embodiments, a particular same stack subscriber 235 receives an event structure from messaging server 230 when messaging server 230 calls a function implemented by the particular same stack subscriber 235.

Different stack subscribers 255 are subscribers that belong to a different stack than uniform event manager 220 and event bus manager 225. Different stack subscribers 235 receive event structures from different stack client subscriber 240.

Different stack client subscriber 240 is a subscriber that belongs to the same stack as uniform event manager 220 and event bus manager 225. In some embodiments, different stack client subscriber 240 listens for event structures from messaging server 230 that are intended for different stack subscribers 255. Different stack client subscriber 240 may receive event structures from messaging server 230 through an REST-based protocol and, in response, forward the event structures to different stack subscribers 255. In some embodiments, different stack client subscriber 240 receives event structures from messaging server 230 through a hypertext transfer protocol (HTTP) communication layer.

BPM subscriber 245 is a subscriber that belongs to the same stack as uniform event manager 220 and event bus manager 225. In some embodiments, BPM subscriber 245 coordinates the triggering of one or more business processes in response to receiving an event structure. For instance, BPM subscriber 245 may coordinate calls to different systems (e.g., a process integration system such as Dell Boomi, IBM Cast Iron, SAP HANA Cloud Integration, etc.) for performing different operations (e.g., update different systems with different data associated with the event) in response to receiving the event structure.

External event client subscriber 250 is a subscriber that belongs to the same stack as uniform event manager 220 and event bus manager 225. In some embodiments, external event client subscriber 250 listens for event structures from messaging server 230 that are intended for external event subscribers 260. As mentioned above, an event structure may indicate that an event is allowed to be distributed externally to the system 200 in some embodiments. In some such embodiments, external event client subscriber 250 may listen for event structures that have such indication. When external event client subscriber 250 receives an event structure that indicates an event that is allowed to be externally distributed, external event client subscriber 250 determines external event subscribers 260 to which the event structure may be forwarded by accessing a registry list of registered subscribers (e.g., external event subscribers 260).

External event subscribers 260 are subscribers that are external to system 200. In other words, external event subscribers 260 operate in a system different from system 200. In some embodiments, external event subscribers 260 may be business process outsourcing (BPO) systems and/or entities.

As mentioned above by reference to FIG. 1, an event subscriber may be an event publisher. As such, in some embodiments, any of the same stack subscribers 235 and different stack subscribers 255 may be one of applications 205, application modules 210, or rules engines 215. In some such embodiments, one such same stack subscriber 235 or different stack subscriber 255 may trigger an event (e.g., by sending an event notification to uniform event manager 220) and cause subscribers (e.g., same stack subscribers 235 and different stack subscribers 255) of such an event to trigger additional events and so on and so forth. For example, an employment management application may publish a particular event indicating that an employee is going on a leave of absence. A learning management application that subscribes to leave of absence events may publish another event indicating that the employee will not be available to teach learning courses during the employee's leave of absence. The employee management system may subscribe to learning course events and may update the schedules of employees enrolled in the learning courses. A compensation management application that subscribes to leave of absence events may adjust the compensation of the employee during the employee's leave of absence.

The techniques described above by reference to the systems illustrated in FIGS. 1 and 2 allow the logic of event publishers (e.g., event publisher 105, applications 205, application modules 210, and rules engines 215) and subscribers (e.g., same stack subscribers 235, different stack subscribers 255, BPM subscriber 245, external event subscribers 260, etc.) to be independent of one another. That is, events may be handled and interpreted in the context of each individual subscriber's system and/or rules.

Figure 3:
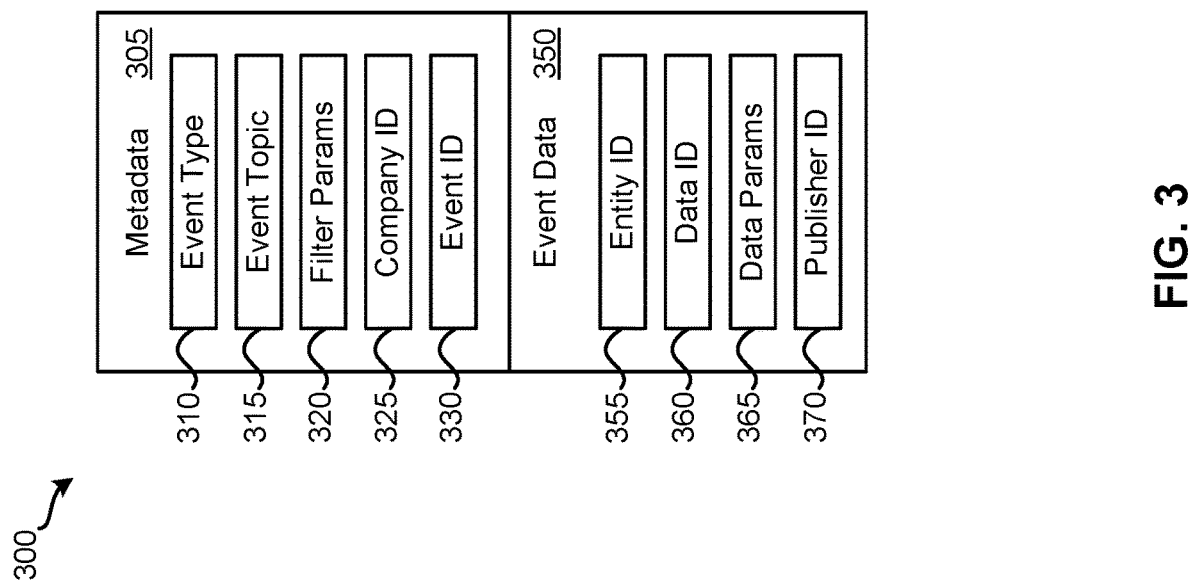
FIG. 3 illustrates an event structure according to some embodiments.

FIG. 3 illustrates a data structure of an event structure 300 according to some embodiments. In some embodiments, a uniform event framework (e.g., uniform event framework 110) generates event structure 300 for an event in response to receiving an event notification associated with the event from an event publisher (e.g., event publisher 105, application 205, application module 210, rules engine 215, etc.).

As shown, event structure 300 includes metadata 305 and event data 350. Metadata 305 includes event type 310, event topic 315, filter parameters 320, company identifier 325, and event identifier 330. Event type 310 specifies a type of event (e.g., a manager change event, a job title change event, a leave of absence event, or any other type of event described above). Event topic 315 specifies a topic associated with the event. As explained above, a topic hierarchy may be employed to organize events in some embodiments. In some such embodiments, event topic 315 specifies a topic in the topic hierarchy. Filter parameters 320 specifies parameters that event subscribers may use to filter through event structures. For instance, filter parameters 320 may specify whether the event is allowed to be distributed externally. This way, an event subscriber (e.g., external event client subscriber 250) listening for events that are allowed to be distributed externally may identify such events based on filter parameters 320 of event structures. Company identifier 325 is a unique identifier for identifying a company associated with the event. Event identifier 330 is a unique identifier for identifying the event.

Event data 350 includes entity identifier 355, data identifier 360, data parameters 365, and publisher identifier 370. In some embodiments, systems 100 and 200 organize data according to a relational data model defines entities and relationships among the entities. In some such embodiments, entity identifier 355 is a unique identifier for identifying an entity in the relational data model that is associated with data associated with the event. Data identifier 360 is a unique identifier for identifying the data associated with the event. In some embodiments, an event subscriber uses data identifier 360 to retrieve the data associated with the event. Data parameters 365 specify parameters for qualifying the data associated with the event. Publisher identifier 370 is a unique identifier for identifying a publisher of the event (e.g., event publisher 105, application 205, application module 210, rules engine 215, etc.).

FIG. 3 shows an example event structure that is generated by a uniform event framework. One of ordinary skill in the art will appreciate that a uniform event framework may generate an event structure that includes additional and/or different data in different embodiments. For example, in some embodiments, an event structure may include a date parameter for specifying a timestamp associated with the event, a user identifier that is a unique identifier for identifying a user associated with the event (e.g., a user that triggered the event), etc.

Figure 4:
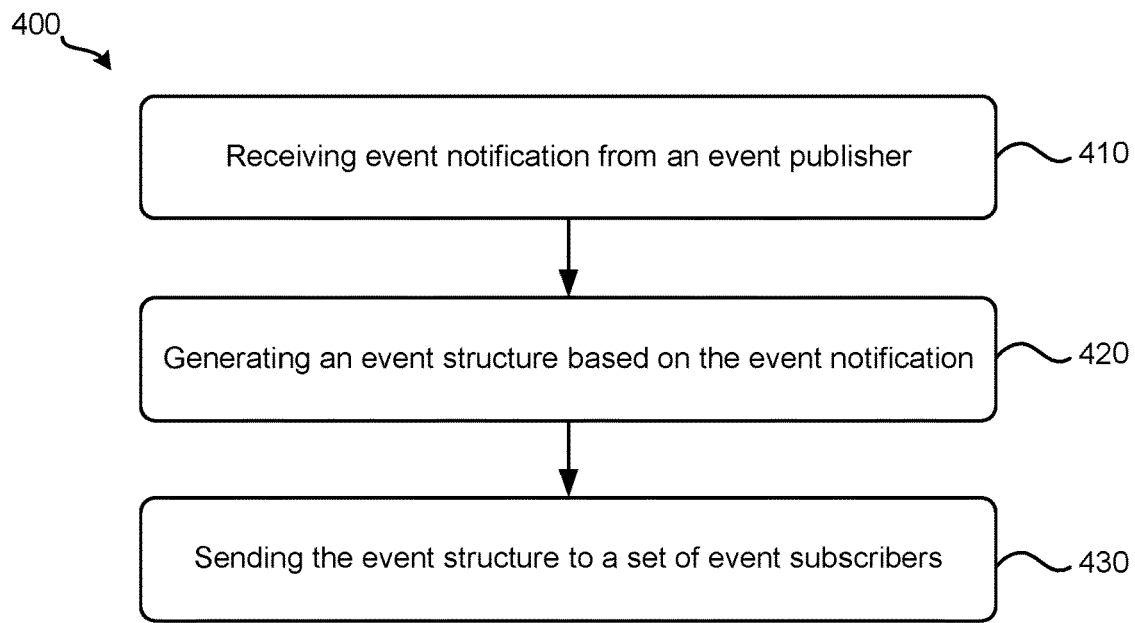
FIG. 4 illustrates a process for distributing events according to some embodiments.

FIG. 4 illustrates a process 400 for distributing events according to some embodiments. In some embodiments, a uniform event framework (e.g., uniform event framework 110) performs process 400. Process 400 starts by receiving, at 410, an event notification from an event publisher. Referring to FIG. 1 as an example, event publisher 105 may publish an event to uniform even framework 110. In this example, uniform event framework 110 may receive an event notification associated with the event from event publisher 105.

Next, process 400 generates, at 420, an event structure based on the event notification from the event publisher. Referring to FIG. 3 an example, process 400 generates event structure 300 based on an event notification from an event publisher. Finally, process 400 sends, at 420, the event structure to a set of event subscribers. Referring to FIG. 1 as an example, uniform event framework 110 may send event structure 130 to event subscribers 120 by sending event structure 130 to event bus 115. In turn, event bus 115 sends event structure 130 to event subscribers 120. In some embodiments, the event structure allows an event subscriber to retrieve data associated with the event from the event publisher via callbacks to the event publisher. Referring to FIG. 1 as an example, an event subscriber 120 may perform a callback based on event structure 130 to event publisher 105 for data associated with the event.

Figure 5:
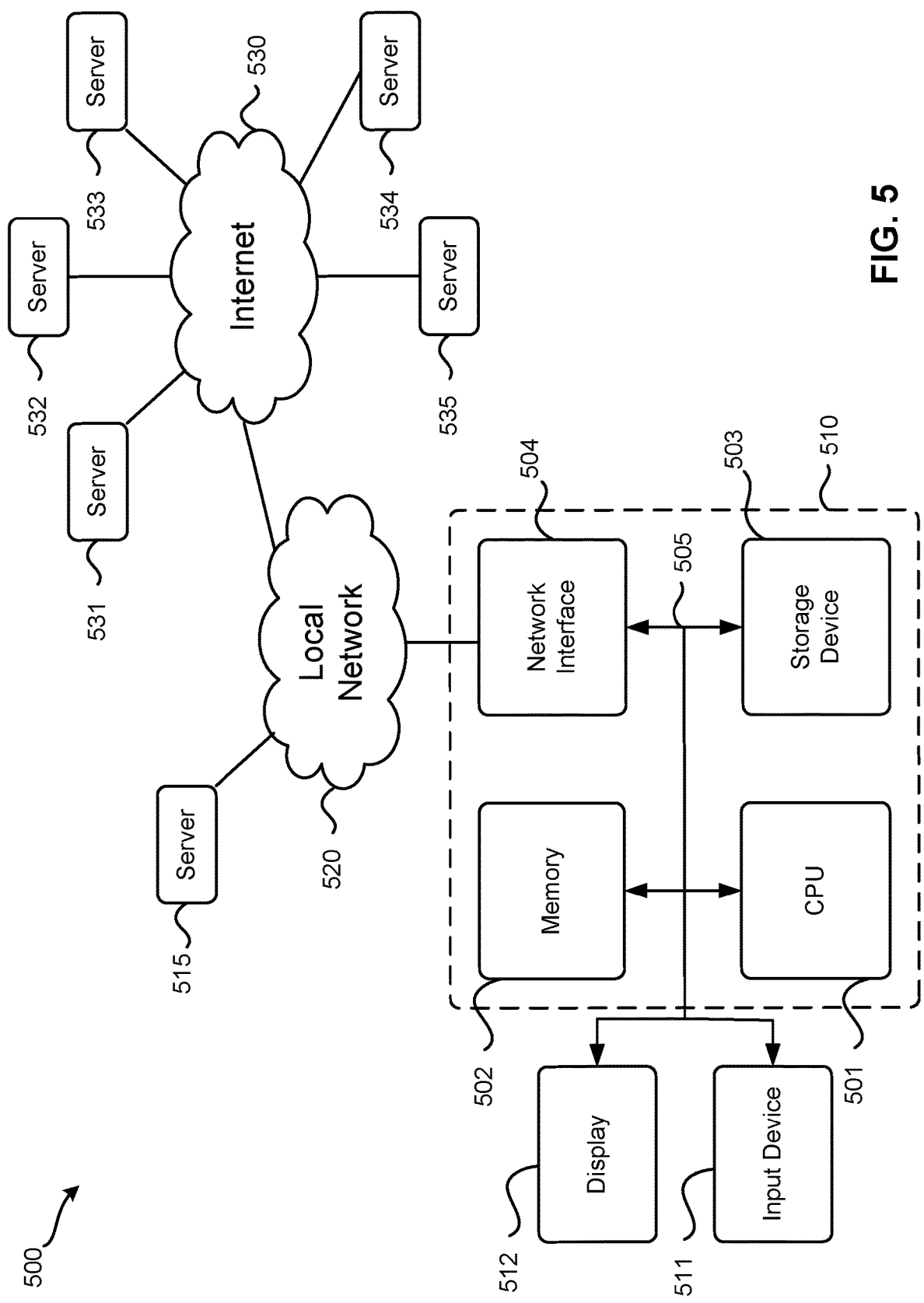
FIG. 5 illustrates an exemplary computer system according to some embodiments.

An exemplary computer system 500 is illustrated in FIG. 5. Computer system 510 includes a bus 505 or other communication mechanism for communicating information, and a processor 501 coupled with bus 505 for processing information. Computer system 510 also includes memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system comprising:
    a set of event publishers configured to publish events occurring on the event publishers;
    a uniform event framework configured to receive, from an event publisher in the set of event publishers, an event notification indicating an event occurred on the event publisher and generate an event structure based on the event notification, wherein the event is associated with a topic in a hierarchy of topics, wherein the event structure comprises an event identifier for identifying the event, an event publisher identifier for identifying the event publisher, and an event topic for specifying the topic in the hierarchy of topics; and
    an event bus configured to receive the event notification from the uniform event framework, determine that a first event subscriber in the plurality of event subscribers is configured to receive events associated with the specified topic in the hierarchy of topics, determine that a second event subscriber in the plurality of event subscribers is configured to receive events associated with the specified topic in the hierarchy of topics, and send, based on the event topic of the event structure, the event structure to the first and second event subscribers for consumption of the event structure, wherein the event publisher is further configured to:
receive a first callback from the first event subscriber for only a first set of data associated with the event;
receive a second callback from the second event subscriber for only a second different set of data associated with the event;
in response to receiving the first callback, send the first event subscriber only the first set of data associated with the event; and
in response to receiving the second callback, send the second event subscriber only the second different set of data associated with the event.

2. The system of claim 1, wherein at least one event subscriber in the plurality of event subscribers and the uniform event framework are developed on a same software framework.

3. The system of claim 1, wherein at least one event subscriber in the plurality of event subscribers and the uniform event framework are developed on different software frameworks.

4. The system of claim 1, wherein the event publisher provides a set of application programming interfaces to the subset of the plurality of event subscribers through which the event publisher receives the first and second callbacks for the first and second sets of data associated with the event.

5. The system of claim 1, wherein an event subscriber in the subset of the plurality of event subscribers is configured to forward the event structure to a set of event subscribers operating on a different system.

6. The system of claim 1, wherein the event publisher is a rules engine configured to publish at least one event of the events based on rules for configuring defined events.

7. The system of claim 1, wherein the event publisher is an application configured to publish at least one event of the events based on code included in the application.

8. A non-transitory computer-readable medium storing a program executable by at least one processing unit, the program comprising sets of instructions for:
receiving, from an event publisher in a set of event publishers, an event notification indicating an event occurred on the event publisher, wherein the event is associated with a topic in a hierarchy of topics, wherein the event structure comprises an event identifier for identifying the event, an event publisher identifier for identifying the event publisher, and an event topic for specifying the topic in the hierarchy of topics;
generating an event structure based on the event notification;
determining that a first event subscriber in the plurality of event subscribers is configured to receive events associated with the specified topic in the hierarchy of topics;
determining that a second event subscriber in the plurality of event subscribers is configured to receive events associated with the specified topic in the hierarchy of topics; and
sending, based on the event topic of the event structure, the event structure to the first and second event subscribers for consumption of the event structure,
wherein the event publisher is configured to:
receive a first callback from the first event subscriber for only a first set of data associated with the event;
receive a second callback from the second event subscriber for only a second different set of data associated with the event;
in response to receiving the first callback, send the first event subscriber only the first set of data associated with the event; and
in response to receiving the second callback, send the second event subscriber only the second different set of data associated with the event.

9. The non-transitory computer-readable medium of claim 8, wherein at least one event subscriber in the plurality of event subscribers and a uniform event framework that receives the event notification and generates the event structure are developed on a same software framework.

10. The non-transitory computer-readable medium of claim 8, wherein at least one event subscriber in the plurality of event subscribers and a uniform event framework that receives the event notification and generates the event structure are developed on different software frameworks.

11. The non-transitory computer-readable medium of claim 8, wherein the event publisher provides a set of application programming interfaces to the subset of the plurality of event subscribers through which the event publisher receives the first and second callbacks for the first and second sets of data associated with the event.

12. The non-transitory computer-readable medium of claim 8, wherein an event subscriber in the subset of the plurality of event subscribers is configured to forward the event structure to a set of event subscribers operating on a different system.

13. The non-transitory computer-readable medium of claim 8, wherein the event publisher is a rules engine configured to publish at least one event of the events based on rules for configuring defined events.

14. The non-transitory computer-readable medium of claim 8, wherein the event publisher is an application configured to publish at least one event of the events based on code included in the application.

15. A method comprising:
receiving, from an event publisher in a set of event publishers, an event notification indicating an event occurred on the event publisher, wherein the event is associated with a topic in a hierarchy of topics, wherein the event structure comprises an event identifier for identifying the event, an event publisher identifier for identifying the event publisher, and an event topic for specifying the topic in the hierarchy of topics;
generating an event structure based on the event notification;
determining that a first event subscriber in the plurality of event subscribers is configured to receive events associated with the specified topic in the hierarchy of topics;
determining that a second event subscriber in the plurality of event subscribers is configured to receive events associated with the specified topic in the hierarchy of topics; and
sending, based on the event topic of the event structure, the event structure to the first and second event subscribers for consumption of the event structure,
wherein the event publisher is configured to;
receive a first callback from the first event subscriber for only a first set of data associated with the event;
receive a second callback from the second event subscriber for only a second different set of data associated with the event;

in response to receiving the first callback, send the first event subscriber only the first set of data associated with the event; and in response to receiving the second callback, send the second event subscriber only the second different set of data associated with the event.

16. The method of claim 15, wherein at least one event subscriber in the plurality of event subscribers and a uniform event framework that receives the event notification and generates the event structure are developed on a same software framework.

17. The method of claim 15, wherein at least one event subscriber in the plurality of event subscribers and a uniform event framework that receives the event notification and generates the event structure are developed on different software frameworks.

18. The method of claim 15, wherein the event publisher provides a set of application programming interfaces to the subset of the plurality of event subscribers through which the event publisher receives the first and second callbacks for the first and second sets of data associated with the event.

19. The method of claim 15, wherein an event subscriber in the subset of the plurality of event subscribers is configured to forward the event structure to a set of event subscribers operating on a different system.

20. The method of claim 15, wherein the event publisher is a rules engine configured to publish at least one event of the events based on rules for configuring defined events.

* * * * *